(12) United States Patent
Gerhan

(10) Patent No.: US 7,313,160 B1
(45) Date of Patent: Dec. 25, 2007

(54) REGULATION SYSTEM ANALYSIS METHOD

(75) Inventor: Ronald E. Gerhan, Avon Lake, OH (US)

(73) Assignee: Graftech International Holdings Inc., Parma, OH (US)

( * ) Notice: Subject to any disclaimer, the term of this patent is extended or adjusted under 35 U.S.C. 154(b) by 33 days.

(21) Appl. No.: 11/302,960

(22) Filed: Dec. 14, 2005

(51) Int. Cl.
*H05B 7/144* (2006.01)
*H05B 7/148* (2006.01)

(52) U.S. Cl. .................. 373/104; 373/102; 373/105

(58) Field of Classification Search ........ 373/102–108, 373/144, 148
See application file for complete search history.

(56) References Cited

U.S. PATENT DOCUMENTS 5,255,285 A * 10/1993 Aberl et al. ................ 373/105
6,603,795 B2 * 8/2003 Ma et al. .................... 373/102

* cited by examiner

*Primary Examiner*—Quang Van
(74) *Attorney, Agent, or Firm*—James R. Cartiglia; Waddey & Patterson P.C.

(57) ABSTRACT

A furnace's operating efficiency is improved by simultaneously monitoring various furnace operating parameters such that the monitored values may be collectively examined and correlated to determine if the furnace is sub optimally operating. In particular, the electrode current, hydraulic valve spool position, hydraulic fluid pressure, and electrode mast position of an electrical arc furnace are simultaneously monitored and correlated to determine if any unidentified sub optimal operating conditions are present. By improving the chances of detecting and correcting sub optimal operating conditions, the present invention improves the electrode consumption and overall efficiency of a furnace's operation.

4 Claims, 2 Drawing Sheets

REGULATION SYSTEM ANALYSIS METHOD

BACKGROUND OF THE INVENTION

Electric arc furnaces are used to melt different metallurgical elements such as iron coming from scrap, iron ore, etc. The metal is melted by intense heat created by an electrical arc produced between an electrode and the scrap or ore. The electric arc furnace is basically composed of a shell to retain the scrap and melted metal; a set of electrodes to create the arcs needed to melt the metal; a set of actuators, which are controlled by a regulator, to control the electrodes distance from the scrap; and a large current power supply to supply the arc currents. When the melting is completed, impurities that float to the surface are skimmed or scraped from the surface and the liquid metal is poured from the shell for further processing.

The most important aspect of arc-furnace operation is productivity optimization, which includes energy efficiency. Thus, an electric arc-furnace is operated to produce the greatest amount of metal using the least amount of energy possible. The primary source of energy in an electric arc furnace is produced by the utilization of electricity. This electrical energy is complemented by chemical energy. Chemical energy may be derived from but not limited to a chemical reaction, ($CO+O=CO_2$), or by the burning of oxygen or natural gas. A good electric arc furnace operation will balance the total energy input for production, efficiency and cost. Any furnace problems such as electrical arc instability or electrode degradation adversely affect productivity by increasing electricity usage and/or processing time. Monitoring an electric arc furnace to insure that it is operating optimally increases the productivity of the furnace. This monitoring typically involves monitoring an amount of current flowing in an electrode. If the monitored current flow indicates a non-optimal operation, the controlling regulator's operation is then changed based upon the measured value of the electrode current. Unfortunately, simply altering the regulator's performance only compensates for the problem without addressing or identifying the underlying root cause of the problem. Therefore, in view of the above discussed limitations of the prior art, what is needed is an improved method and system for monitoring an arc furnace's performance that increases productivity without requiring substantial increases in labor costs.

BRIEF SUMMARY OF THE INVENTION

An embodiment of the present invention is directed toward a method of optimizing operation of an electrical arc furnace. In accordance with the method, a current flowing through a furnace electrode is monitored. A regulator signal, hydraulic valve spool position, hydraulic fluid pressure, and electrode mast position are monitored simultaneously with the electrode current on each of the electrodes. The monitored values are correlated to identify a optimal furnace operating condition and an operating parameter of the arc furnace is altered based upon the correlation. Most preferably, regulator signal is altered based upon the correlation. If any of the monitored values satisfies an action threshold, an action associated with the action threshold is performed.

Another embodiment of the present invention is directed toward a device for monitoring operation of an electrical arc furnace. The device includes an electrode current monitor for monitoring a current in an electrode of the electrical arc furnace. A furnace regulator monitor monitors a regulator signal produced by a furnace regulator. The furnace regulator signal and the electrode current are monitored simultaneously such that individual values of the electrode current can be correlated to individual values of the regulator signals with respect to time. A hydraulic valve spool position monitor, a hydraulic fluid pressure monitor and an electrode mast position monitor are also included in an alternative embodiment for simultaneously monitoring of hydraulic value spool position, hydraulic fluid pressure, and electrode mast position for each electrode of the electrical arc furnace. An operating parameter or setting such as regulator signal of the arc furnace is altered based upon the correlation. An alarm system determines if any of the monitored values satisfies an action threshold and produces an alarm associated with the threshold if the threshold is satisfied.

Yet another embodiment of the present invention is directed toward a method of monitoring an electric arc furnace operation. In accordance with the method a first furnace parameter is monitored and a second furnace parameter is simultaneously monitored. The method then determines if a value of the first furnace parameter indicates sub optimal furnace operation in view of a value of the simultaneously monitored second furnace parameter. Preferably, the first furnace parameter is an electrode current in an electrode of the electrical arc furnace and the second furnace parameter is a regulator signal produced by a regulator of the electrical arc furnace. In addition, a third furnace parameter may be simultaneously monitored to determine if the first, second and third furnace parameters collectively indicate sub optimal furnace operation. The number of monitored parameters is not limited and can cascade as far as required to determine the optimal electric arc furnace setting or operation.

DETAILED DESCRIPTION OF THE INVENTION

Figure 1:
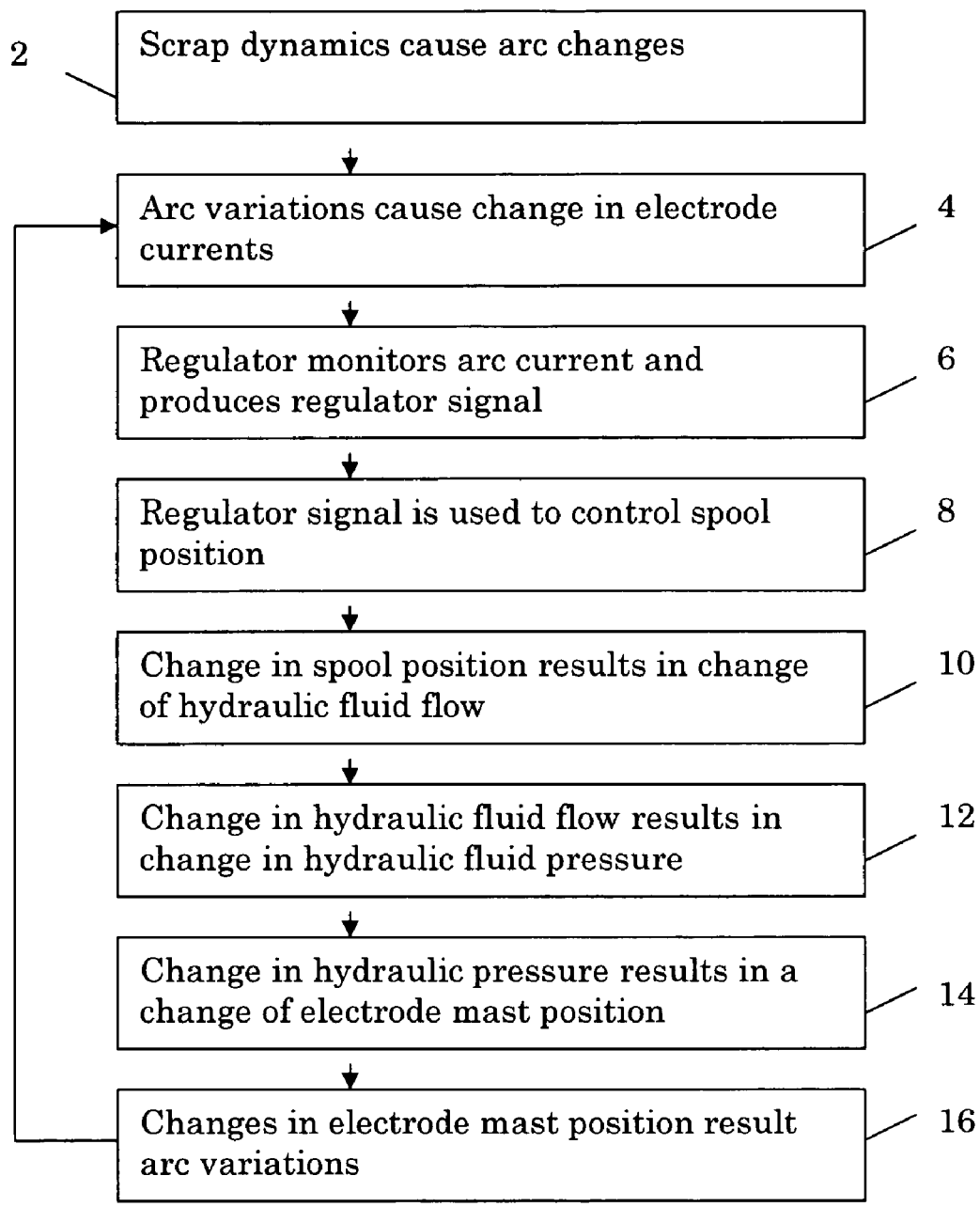
FIG. 1 is flow chart of the operation of a prior art arc furnace's regulation system.

Referring now to FIG. 1, a flow chart of a prior art arc furnace's regulation system's operation is shown. Regulation systems regulate the production of the electrical arc in an arc furnace. Typically, the regulation system attempts to compensate for changes in various furnace operating conditions by altering a furnace operating parameter such as the electrode mast position. For example, a typical regulation scheme involves monitoring the electrode current in an arc furnace. At some point in time, a change in the furnace's operating conditions, such as a change in the dynamics of the scrap in the furnace shell, causes changes in the distance between the scrap and the electrode as shown in block 2. In block 4, this change in the distance between the scrap and the electrode causes a corresponding change in the amount of current flowing in the electrode. As set forth in block 6, the regulation system monitors the electrode current and produces a regulator signal based thereon. The regulator signal is sent to a hydraulic value where it is used to alter the position of the hydraulic valve spool as shown in block 8. A change in the hydraulic valve spool position results in a corresponding change in the direction and magnitude of the hydraulic fluid flow as shown in block 10. The change in the hydraulic fluid flow then results in a corresponding change in the hydraulic fluid pressure in block 12. In block 14, the change in hydraulic fluid pressure results in a corresponding change of the electrode mast position. The change in the electrode mast position then alters the currents flowing in the electrodes which are being monitored by the regulation system in block 16. The process is then repeated until another change in the electrode currents that requires adjustment is detected by the regulator system in block 4.

As discussed above with respect to FIG. 1, a typical regulation system monitors the current in the arc furnace electrodes and alters the electrode mast position to compensate for any detected changes in the electrode current. While the changes in electrode current may be due to scrap dynamics, they could also be due to a variety of other furnace conditions such as improper hydraulic valve spool positioning, leaking hydraulic cylinders, or obstructed mast arm movement that result in suboptimal furnace operation. Many of these suboptimal operating conditions cannot be identified by examining the electrode current in isolation. To properly diagnose these problems, the electrode current has to be monitored in connection with other furnace operating parameters such that the parameters can be correlated. Unfortunately, prior art regulation systems merely compensate for detected changes in the electrode currents and are unable to correct or identify any underlying reasons for the variations in the electrode currents.

Figure 2:
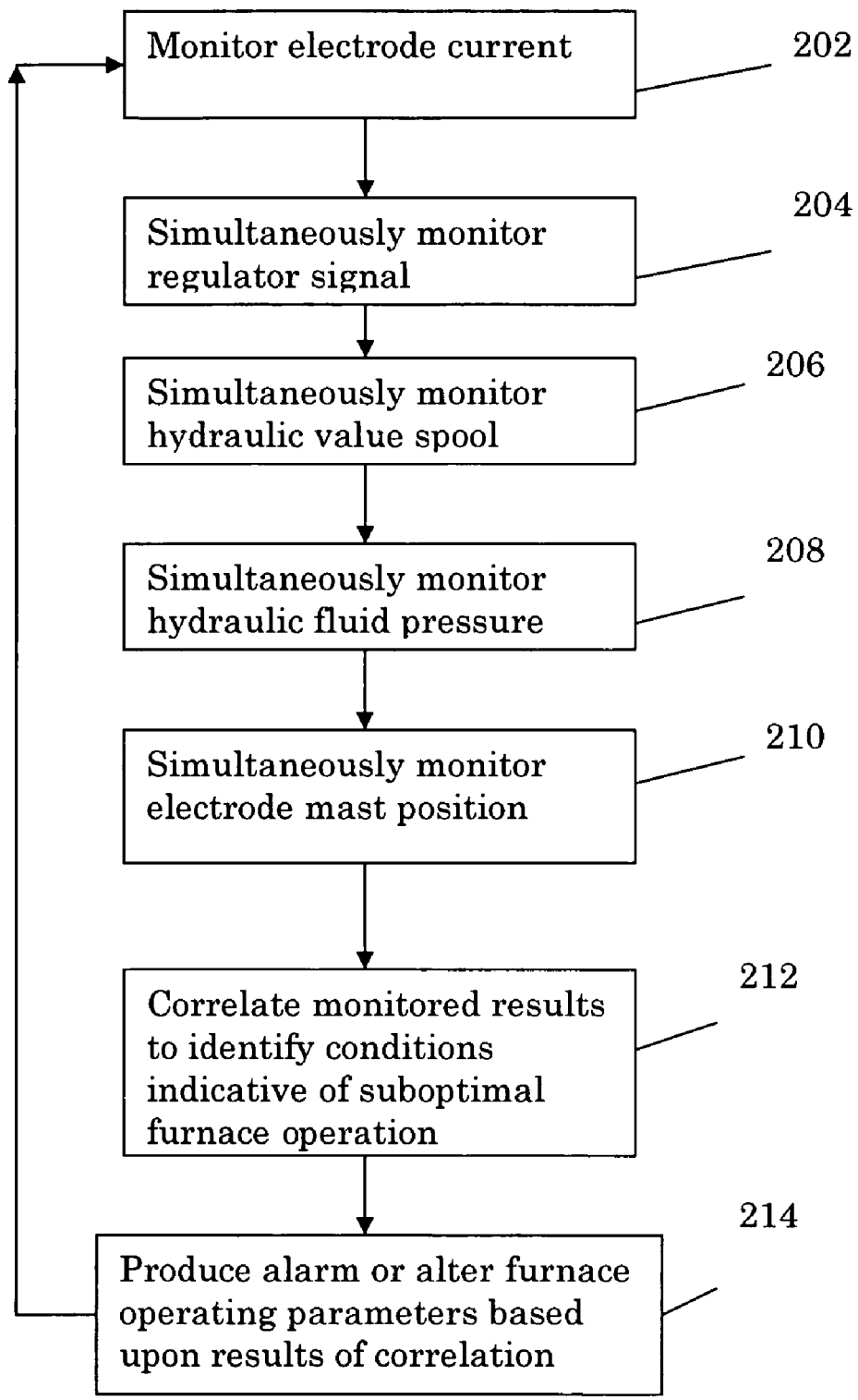
FIG. 2 is a flow chart of a method of monitoring and analyzing an arc furnace regulation system in accordance with an embodiment of the present invention.

Referring now to FIG. 2, a flow chart of a method of monitoring and analyzing an arc furnace regulation system in accordance with an embodiment of the present invention is shown. The basic procedure is to simultaneously monitor various aspects of the furnace's regulation system and correlate the gathered information to optimize the operation of the furnace. The method begins in block 202 with the monitoring of the electrode current. In block 204, the regulator signal is simultaneously monitored. The hydraulic value spool position is also simultaneously monitored in block 206. In block 208, the hydraulic pressure is monitored simultaneously along with the previously set forth parameters. In block 210, the position of the electrode mast is simultaneously monitored. The steps of the method shown in FIG. 2 are shown in a particular order, however, the furnace operating parameters are preferably monitored as simultaneously as possible. Once the data concerning the operation of the various systems that are being simultaneously monitored has been gathered, the method proceeds to block 212 wherein the simultaneously monitored values are correlated to identify conditions indicative of suboptimal furnace operation. The correlation conditions may be based upon historical operating parameters or known operational problems. If a particular set of values correspond to a recognized operational problem, an alarm or set of instructions is produced that informs furnace personnel of the detected problem and the proper manner of correcting the problem in block 214. Under certain circumstances, the furnace may be able to automatically correct the problem without any operator assistance based upon monitored parameters.

By monitoring the furnace operating parameters in a simultaneous fashion, changes in one parameter, such as electrode current, can be correlated with changes in other parameters, such as hydraulic pressure, to identify problems that cannot be accurately diagnosed by examining only one parameter in isolation. For example, a particular hydraulic pressure may only indicate a problem only when the pressure occurs in connection with a particular electrode current. Thus, simultaneous monitoring of the arc furnace's regulation system operating parameters allows the parameter values to be correlated such that the root causes of problems can be identified and corrected for as opposed to just compensated for as in prior art systems.

Thus, although there have been described particular embodiments of the present invention of a new and useful Regulation System Analysis Method, it is not intended that such references be construed as limitations upon the scope of this invention except as set forth in the following claims.

The invention claimed is:

1. A method of monitoring an electrical arc furnace's operation, said method comprising:
   monitoring a first furnace parameter selected from a current flowing through a furnace electrode, a regulator signal, a hydraulic valve spool position, a hydraulic fluid pressure and a position of a electrode mast;
   simultaneously monitoring a second furnace parameter selected from the current flowing through the furnace electrode, the regulator signal, the hydraulic valve spool position, the hydraulic fluid pressure and a position of the electrode mast, wherein the second furnace parameter is different than the first furnace parameter;
   determining if a value of said first furnace parameter indicates sub optimal furnace operation in view of a value of said simultaneously monitored second furnace parameter; and
   altering at least one of the current flowing through the furnace electrode, the regulator signal, the hydraulic valve spool position, the hydraulic fluid pressure and the position of the electrode mast based on the determination.

2. The method of claim 1 wherein said first furnace parameter is the electrode current in the electrode of said electrical arc furnace.

3. The method of claim 1 wherein said second furnace parameter is the regulator signal produced by a regulator of said electrical arc furnace.

4. The method of claim 1 further comprising simultaneously monitoring a third furnace parameter selected from the current flowing through the furnace electrode, the regulator signal, the hydraulic valve spool position, the hydraulic fluid pressure and a position of the electrode mast, wherein the second furnace parameter is different than the first furnace parameter, wherein the third furnace parameter is different than the first and second furnace parameters, and determining if said first, second and third furnace parameters collectively indicate sub optimal furnace operation.

* * * * *